Figure 1:
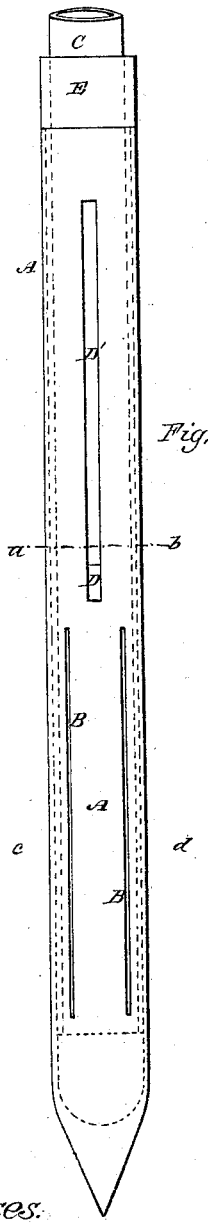
Figure 3:
Figure 4:
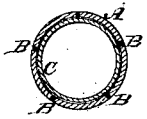
Figure 2:

P. J. Hershey,
Well Tubing.

No. 63,387. Patented Apr. 2, 1867.

Witnesses:
E. B. Forbush
B. H. Muehle

Inventor:
P. J. Hershey

United States Patent Office

PETER J. HERSHEY, OF CLARENCE, NEW YORK.

Letters Patent No. 63,387, dated April 2, 1867.

---

IMPROVED WELL TUBE.

---

*The Schedule referred to in these Letters Patent and making part of the same.*

---

TO ALL WHOM IT MAY CONCERN:

Be it known that I, PETER J. HERSHEY, of the town of Clarence, county of Erie, and State of New York, have invented a new and useful improvement in Tube Wells; and I do hereby declare that the following is a full, clear, and exact description thereof, reference being had to the accompanying drawings, making a part of this specification, in which—

Figure I is an elevation of that part of the well tube and shield which contains my improvement.

Figure II is a side elevation of the same.

Figure III is a cross-section on line *a b*.

Figure IV is a cross-section on line *c d*.

Driven tube wells consist mainly of a tube, which is driven into the ground to the required depth to enter the streams of water in the earth, and which is allowed to remain in the ground, forming the well, through which the water is brought to the surface, and a shield or driving-point, which is connected with the tube, and leads the way into the ground. My invention relates to an improvement in this shield, and consists in extending the shield sufficiently to form fine slits for the entrance of water below the coarse slits in which the key works for connecting the shield to the tube, and connecting the tube and shield in such manner that the lower end of the tube will enter the shield sufficiently to close these fine slits while the shield and tube are entering the ground, and also so that the tube will close the key slit when the tube is drawn up sufficiently to uncover the fine slits for the entrance of the water.

Letters of like name and kind refer to like parts in each of the figures.

A represents the driving-point or shield, which consists of a hollow cylinder provided with a solid sharp point at the lower end thereof. Fine slits B are made in the lower half of this cylinder for ingress of water through the shield into the well tube. The lower end of the well tube C works inside of the shield, and is pushed down to the solid point of the shield when entering the ground, thereby covering the fine slits B, and preventing water, sand, gravel, or other matter from entering or filling the tube while in the process of entering the ground. When it is down to its proper depth in the ground then the tube is drawn partly out of the shield, so as to open the slits B, and allow the water to enter the tube. A connection of the shield and tube is made by means of a key, D, which passes transversely through the tube, projecting upon each side thereof, as shown in Fig. III. The projecting ends of the key work in long coarse slots D', made in the upper half of the shield, thereby forming a sliding connection, and preventing the turning of the tube within the shield. A screw collar, E, is formed on the tube C, which rests upon the top of the shield while the tube is in its lowest position within the shield, and while it is being driven into the ground. The well tube screws into this collar, as shown in Fig. I, and the short tube within the shield (which is a continuation of the well tube) also screws into this collar. The coarse slits D' are of the proper length to admit of the requisite movement of the tube within the shield to cover and uncover (upon the inside) the fine slits, and to keep the key slits closed, except for the projecting ends of the key.

What I claim as my invention, and desire to secure by Letters Patent, is—

The shield A, having fine slits B made therein, for the entrance of water, below the coarse or key slits, in combination with the coarse or key slits D', which are kept closed by the tube C in all the movements thereof in the shield, substantially as set forth.

P. J. HERSHEY.

Witnesses:
E. B. FORBUSH,
B. H. MUEHLE.